July 26, 1932.    M. W. MARIEN    1,869,108

PISTON RING

Filed Aug. 3, 1931

INVENTOR:
MELVIN W. MARIEN.

BY Harry A. Reimer
ATTORNEY.

Patented July 26, 1932

1,869,108

UNITED STATES PATENT OFFICE

MELVIN W. MARIEN, OF ST. LOUIS, MISSOURI, ASSIGNOR TO RAMSEY ACCESSORIES MANUFACTURING CORPORATION, OF ST. LOUIS, MISSOURI, A CORPORATION OF MISSOURI

PISTON RING

Application filed August 3, 1931. Serial No. 554,729.

My invention has relation to improvements in piston rings, and it consists in the novel features of construction more fully set forth in the specification and pointed out in the claims.

The invention is more specifically directed to expanders, or inner spring rings for association with the piston ring whereby the latter is maintained in proper working contact with the cylinder wall.

Figure 1:
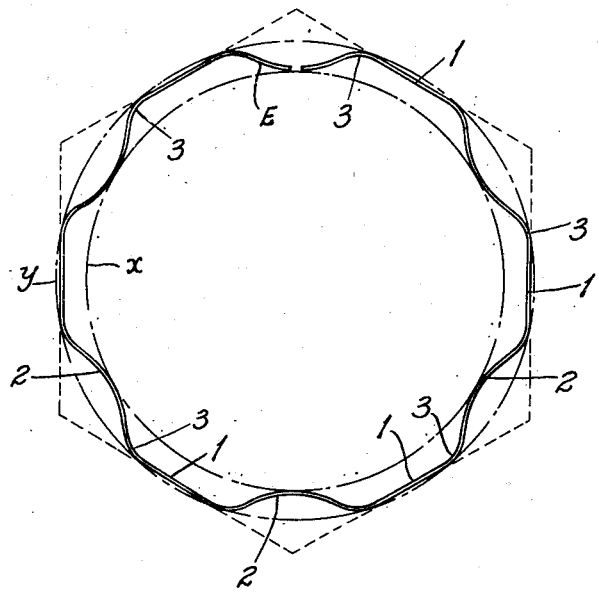
Figure 2:
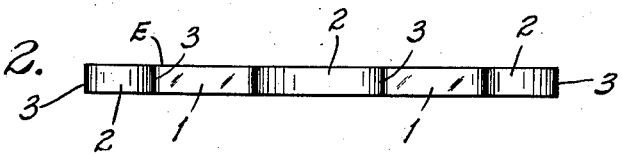
Figure 3:
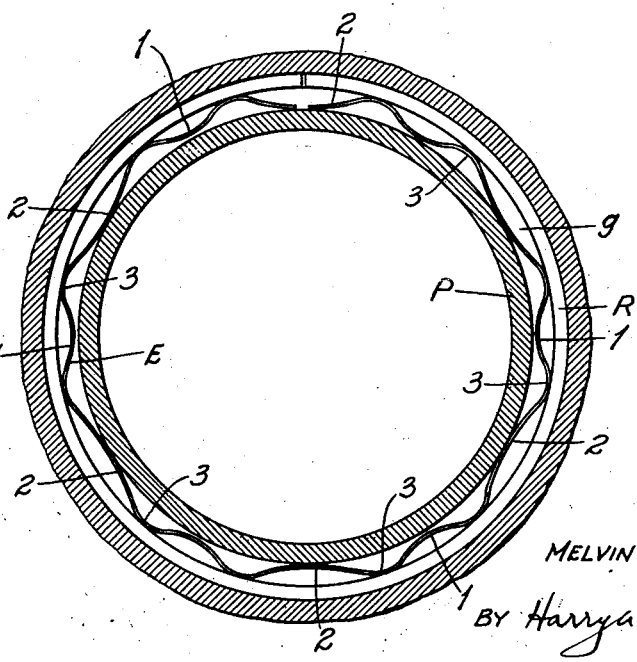

The objects of the invention are to provide an expander for piston rings that will co-operatively engage the ring with negligible friction; one that will impart its tension to the ring substantially uniformly throughout the ring circumference; one that is flexible and at the same time capable of rapid response to the irregularities of the cylinder; one that is durable and retains its tension over a long period of use; one that is so shaped that a given size will fit pistons having a wide range of piston ring groove depths; and one possessing other advantages that will be better apparent from a detailed description of the invention in connection with the accompanying drawing, in which:

Figure 1 is a plan view of my improved expander in its normal shape detached from a piston ring; Fig. 2 is a side elevation thereof; and Fig. 3 is a plan view of the expander compressed in a piston ring groove between the ring and the bottom of the groove.

Referring to the drawing, E represents my improved expander, or inner ring, adapted to be inserted in piston ring groove $g$ of the piston P behind the piston ring R. The expander E is formed in a general polygonal shape from a ribbon of steel, and has a plurality of flat sides 1, 1 etc., and intermediate inwardly curved portions 2, 2 etc. The flat sides 1 and curved portions 2 are connected by rounded corners 3 describing a radius considerably shorter than the radius describing the inwardly curved portions 2. It is essential that the length of the curved portions 2 be greater than the length of flat sides 1 for a reason that will be apparent when the action of the expander is described. I have found in practice that if the length of the side 1 is between 70% and 80% of the length of the inwardly curved portion 2, most satisfactory results are obtained. The expander E is split at the center of one of the inwardly curved portions 2 to enable it to be inserted into the piston ring groove behind the ring R.

Obviously the depth of piston ring grooves varies among different makes of pistons, therefore the amount of space, or clearance, remaining between the piston ring and the bottom of the groove for the expander is not fixed. In determining the shape of the expander E the difference between the radius of a circle $x$ inscribed within the polygon and the radius of a circle $y$ circumscribed around the polygon should be somewhat greater than the space between the bottom of the piston ring groove and the inner surface of the piston ring so that when the expander is inserted in this space it will be under compression. In an expander possessing great flexibility a greater amount of compression may be provided for, which also allows the expander to be applied in pistons having varying groove depths. This is one particular in which an expander made in the shape of the present invention is superior to the old corrugated type of expander and to the plain polygonal type, both of which are well known in the art.

In the old type of polygonal expander having outwardly rounded corners there are as many bearing surfaces against the ring as there are sides to the expander, while in my improved type of polygonal expander having inwardly curved portions 2 there are twice as many outwardly rounded corners 3 as sides. Hence, a six-sided expander (a good practical shape) has twelve bearing surfaces against the inner surface of the ring, and the tension of the expander is imparted to the ring more uniformly throughout its circumference. This wider distribution of the expander tension on the ring insures the outer face of the ring uniform wear, and prevents the formation of flat places on the ring face.

When the expander E is inserted in the ring groove $g$ for use it will be compressed as shown in Fig. 3 between the bottom of the groove and the inner surface of the ring R. The inwardly curved portions 2 will be pressed outwardly by contact with the bottom of groove $g$ until each approaches a straight line. Obviously as the arcs of portions 2 become flattened the rounded corners 3 bear against the inner surface of ring R and are spread slightly more apart with respect to the portions 2. However, with respect to the sides 1 adjacent corners 3, 3 will be forced together causing the sides 1 to bow inwardly as shown in Fig. 3. It is because of this inward bowing of the sides 1 that they must not be too long, for when they have been in far enough to contact with the bottom of groove $g$ the limit of resiliency of the expander has been reached. That the expander becomes rigid when sides 1, as well as portions 2 engage the bottom of groove $g$ should be apparent from the drawings.

In the operation of a piston the expander E is continually expanding and contracting due to irregularities in the cylinder hence there is a certain loss of efficiency due to friction between the expander and the ring. In the old types of expander the sliding of the contacting surfaces on the ring is cumulative hence the frictional losses are great. In the present improved expander the sliding of the humps 3, 3 is confined to each pair with respect to a side 1 or curved portion 2, hence the sliding is not cumulative and the frictional loss slight. Since the expansion of the expander in operation is not appreciably retarded by friction it responds rapidly to the irregularities in the cylinder wall and its full flexibility is available.

Since the flat side 1 of the expander does not bear against the piston P it is not stressed. The stresses imposed on the expander come on the inwardly curved portions 2 which exert pressure through the small connecting arcs 3, 3.

In the operation of the expander the small connecting arcs, or corners 3, do not change their radius of curvature appreciably, but remain substantially the same. If the radius that is used to describe these corners is too great the expander degenerates into one of the old corrugated type with all the resulting stiffness and friction inherent in this type of expander. If the arcs are described by too small a radius they become unduly stressed under compression and tend to exert an excessive force against the outer ring. The relation of the bent portion 2, corner 3, and flat side 1 is such that the inward bend of portion 2 is partially transferred to the side 1 through the corners 3 which substantially retain their original shape.

Since the sides 1 do not contact with the piston when the expander is in operation, the spring action is from the center of one portion 2 to the center of the next giving a long spring leverage conducive to great flexibility. Thus great flexibility is combined in the same expander with a large number of bearing surfaces against the ring.

Having described my invention, I claim:

1. In combination with a piston having a ring groove, a piston ring in said groove, a spring expander disposed in the groove between the bottom thereof and the piston ring, said expander comprising a ribbon of steel of a general polygonal shape having a plurality of inwardly curved sides and substantially straight sides, said inwardly curved sides tending to become flattened under pressure when the expander is in the piston ring groove, and said straight sides tending to become inwardly curved when the expander is in the groove.

2. A spring expander adapted for use in the ring groove of a piston between the bottom thereof and the piston ring, said expander comprising a ribbon of steel in the shape of a ring having a plurality of inwardly curved sides and substantially straight sides alternately arranged, said inwardly curved sides tending to become flattened under pressure when the expander is in the piston ring groove, and said straight sides tending to become curved when the expander is in the groove.

In testimony whereof I hereunto affix my signature.

MELVIN W. MARIEN.